Patented Feb. 23, 1954

2,669,804

UNITED STATES PATENT OFFICE 2,669,804

METHOD OF IMPROVING PLANT YIELDS

Herman Cohen, Brookline, Mass., assignor of one-half to Imperial Talc Company, Inc., Hoboken, N. J., a corporation of New Jersey No Drawing. Application April 16, 1949, Serial No. 88,050

4 Claims. (Cl. 47—9)

This invention relates to the improvement of plant yields, and pertains more particularly to methods for hastening the maturity and increasing uniformity in size of the fruits or berries borne by outdoor trees, bushes or leguminous plants. The practice of the invention is particularly advantageous in citrus fruit orchards, but is also beneficial in growing other fruits, berries and legumes; and it will be understood hereinafter that the use of the generic word "plant" is intended to include various species of fruit trees, berry bushes and leguminous garden plants.

It is well understood that the size and time of maturity of citrus or other fruits depends upon the rate of photosynthesis as affected by the total light available to act upon the catalytic chlorophyll of the plant, during the ripening process; that the fruit of any tree is not uniform in size, primarily because the foliage shades some growing fruit specimens more than others; and that the ripening period would be reduced if more sunlight could be made available to all of the fruit specimens in a given time.

It is accordingly the principal purpose of the present invention to provide a method and means for increasing the total sunlight available to all of the fruit specimens of a tree or other plant, during each period of daylight, thereby accelerating the rate of photosynthesis and transpiration, and ensuring more uniformity in size of the fruit.

A further inherent advantage of the practice of the method herein disclosed is to reduce the surface temperature of the moist earth, thereby decreasing the rate of direct moisture evaporation, increasing the total moisture available to the plant roots, and avoiding the necessity of mulching the surface around the plant.

The improved method involves the scattering over the surface of the orchard, berry patch or garden plot, of relatively small flakes, fragments or particles of light-reflecting substances, so that the ground is substantially covered with a thin layer of discrete, irregularly arranged surfaces or facets capable of reflecting sunlight upwardly in rays projected at a variety of directions. Hence, irrespective of the direction of the sun and the relation of the fruit specimens to the foliage of the tree, all of the growing fruit will receive a maximum of sunlight, the specimens which are shaded from direct sunlight receiving proportionately more light by reflection than they would otherwise receive.

I have found that mica flakes in sizes up to four square inches are most suitable for the purpose, but flakes or fragments of other light reflecting materials, except glass, are satisfactory. Glass fragments are undesirable, unless the surfaces are quite flat, for concaved glass surfaces or faces would focus the light rays and tend to scorch or burn the plant. Metal foil pieces will serve the purpose, and tin foil or aluminum foil sheets are also serviceable if crinkled to provide an irregular reflecting surface.

Various types of mica flakes or fragments may be utilized, including vermiculite, phlogopite and muscovite, but the last variety is preferred because it is relatively colorless. Scrap mica gives optimum results, but mica dust may be utilized, especially if spread on asphaltic or other flexible supporting sheets placed on the ground. Expanded vermiculite is unsuitable, because heat treatment of the shiny material, as mined, substantially destroys its light-reflecting properties.

The light-reflecting flakes or fragments are preferably scattered over the terrain, throughout the orchard, berry patch or garden area, so that the ground is substantially covered with the discrete particles which fall or settle as a thin mat presenting a multitude of relatively small facets disposed in a variety of irregular angularities with respect to each other and to the sun. The mat retains the ground moisture and retards direct evaporation, and the irregular facets reflect sunlight in all directions during all hours of the day, thus materially increasing the total sunlight utilized in photosynthesis, especially where the fruits or berries are heavily shaded from direct sunlight.

The deposited mat or layer of light-reflecting flakes or fragments is verminproof, rotproof and insoluble, and obviates the necessity for the special mulches commonly employed in orchards or gardens. Even when surface irrigation is necessary, the efficacy of the fragment layer is not diminished; for, if the fragments such as mica flake float to the surface, they will settle as a mat of discrete particles when the water is absorbed.

I claim:

1. A method of accelerating and increasing the yield of fruits, berries and legumes, which consists in scattering upon the ground a mat of discrete relatively coarse, solid, water-insoluble particles having substantially flat light-reflecting surfaces, the surfaces of some of the particles being irregularly disposed with relation to the surfaces of other particles, whereby sunlight is reflected from the mat at a plurality of varying angles.

2. A method of accelerating and increasing the yield of uniformly sized fruits, berries and legumes, which consists in spreading on the ground around the plant a layer of discrete irregularly disposed relatively coarse, water-insoluble particles having light-reflecting surfaces disposed at varying angles with respect to each other, to form an uneven layer capable of reflecting sunlight at a plurality of varying angles and of retaining moisture in the ground.

3. A method of accelerating and increasing the yield of uniformly sized fruits, berries and legumes, which consists in scattering on the ground around the plant flakes of water-insoluble relatively course, light reflecting material, so that the flakes substantially cover the ground and present reflecting surfaces disposed at irregular angles, thereby to reflect sunlight in a variety of directions and to retain moisture in the ground.

4. A method of accelerating and increasing the yield of uniformly sized fruits, berries and legumes, which consists in scattering on the ground around the plant flakes of water-insoluble light reflecting material, so that the flakes substantially cover the ground and present reflecting surfaces disposed at irregular angles, thereby to reflect sunlight in a variety of directions, said flakes consisting of mica of an average size less than four square inches.

HERMAN COHEN.

References Cited in the file of this patent

UNITED STATES PATENTS

| Number | Name | Date |
|---|---|---|
| 1,882,377 | Whittelsey | Oct. 11, 1932 |
| 2,192,939 | Slayter | Mar. 12, 1940 |
| 2,198,991 | Dutton | Apr. 30, 1940 |
| 2,203,274 | Anderson | June 4, 1940 |
| 2,240,859 | Rice | May 6, 1941 |
| 2,362,884 | Clark | Nov. 14, 1944 |

FOREIGN PATENTS

| Number | Country | Date |
|---|---|---|
| 527,812 | Germany | June 22, 1931 |
| 142,074 | Switzerland | Nov. 1, 1930 |

OTHER REFERENCES

British Abridgement 319, 783, published November 20, 1929, in the Illustrated Official Journal (Patents), vol. 50, part 4, page 6481.

N. Y. Times, Sunday, November 16, 1947, section 2, page 24-X, article "Protected Alpines," by Norton.

Webster's New International Dictionary, 2d ed. (1944), p. 1551, definition of "mica."